Dec. 25, 1923.  1,478,978
A. MATHIS
WHEEL
Filed Dec. 22, 1920  2 Sheets-Sheet 1
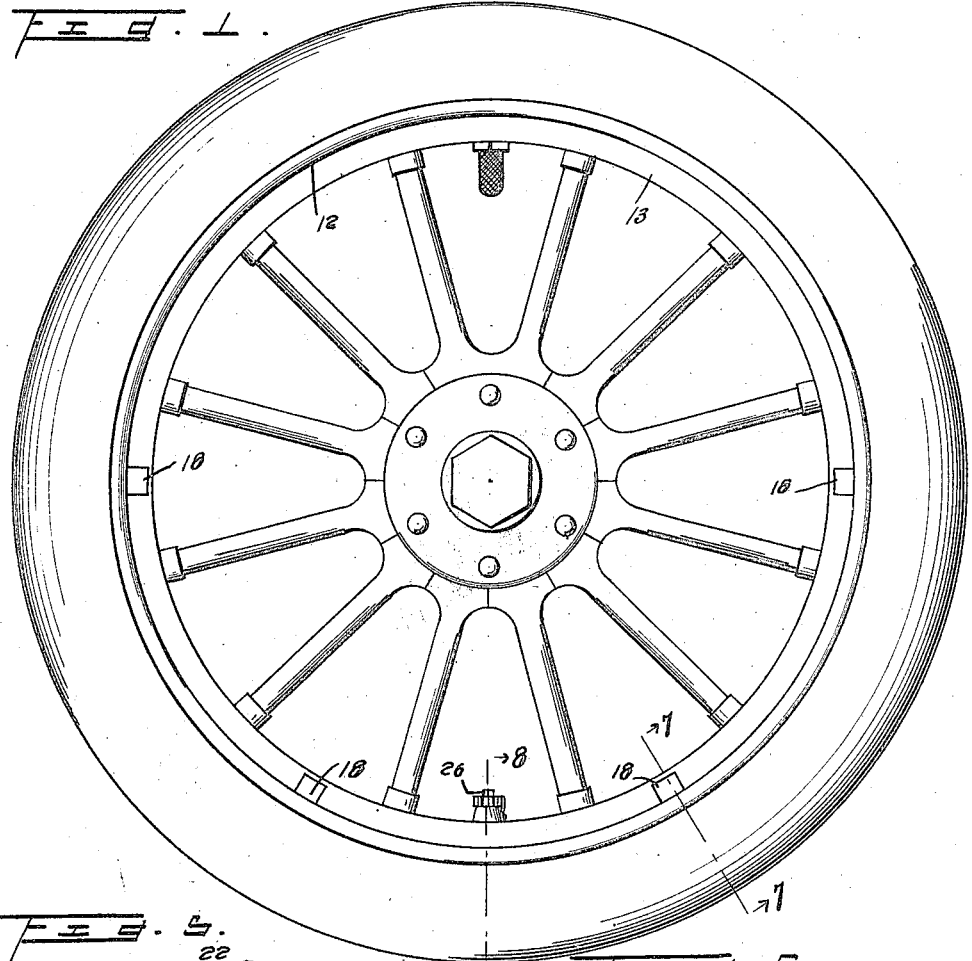
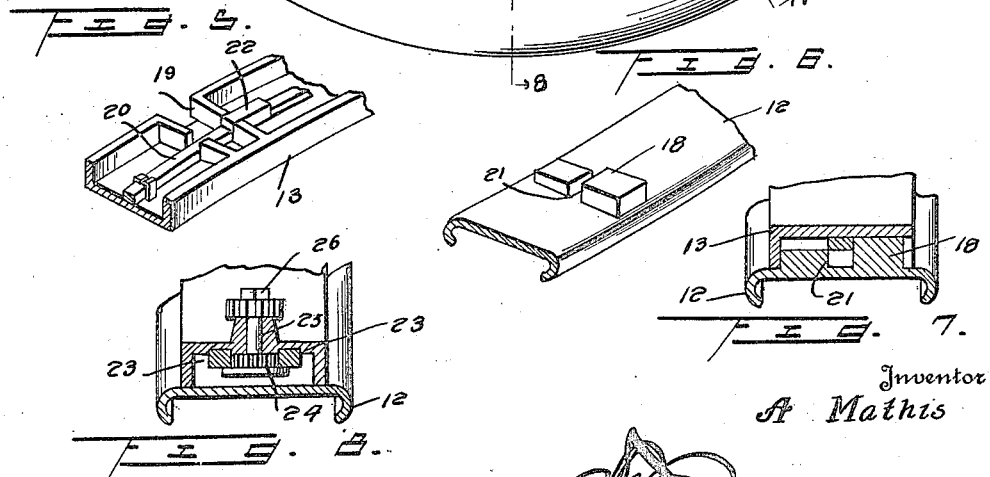
Inventor
A Mathis
By [signature], Attorney

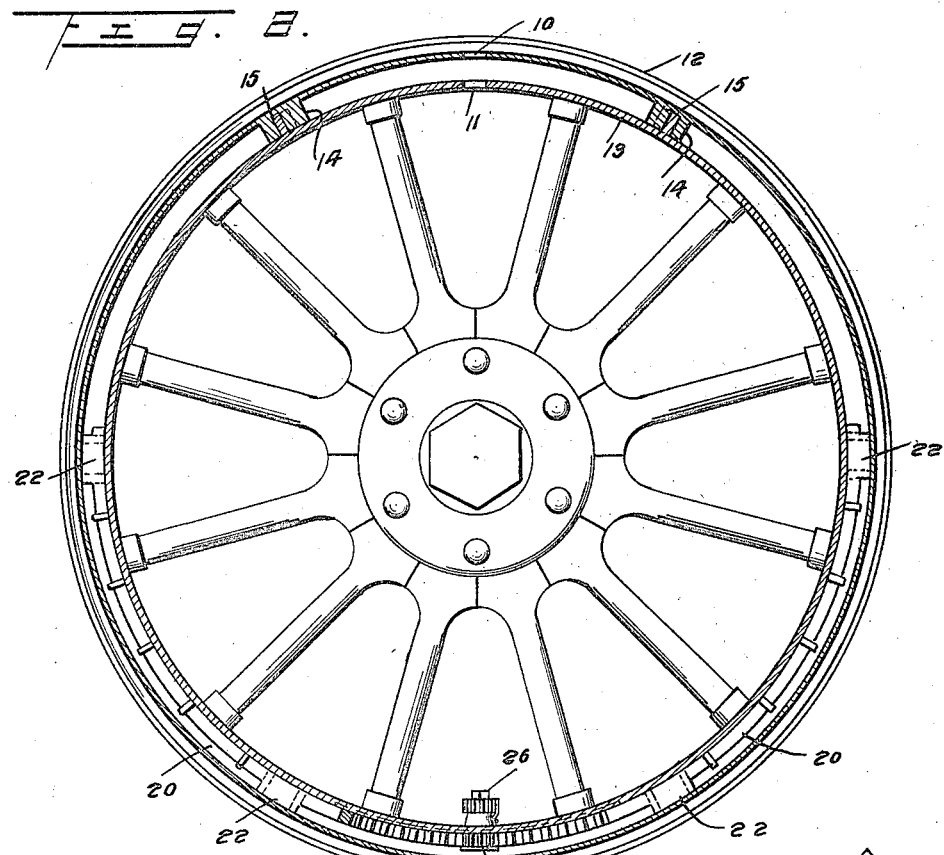
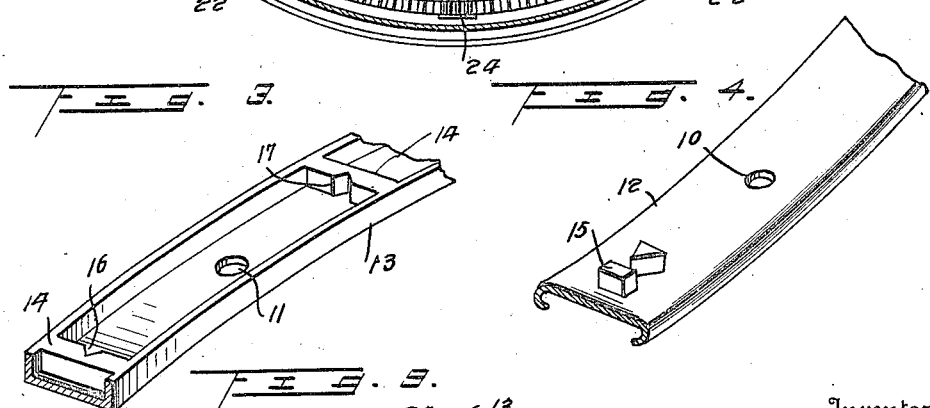
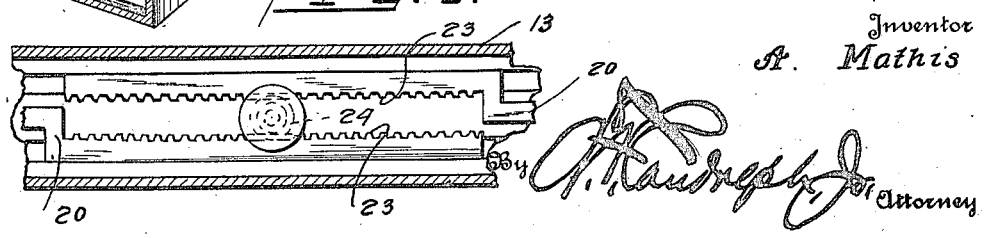

Patented Dec. 25, 1923.

1,478,978

UNITED STATES PATENT OFFICE.

ALFRED MATHIS, OF ELDORADO, ILLINOIS.

WHEEL.

Application filed December 22, 1920. Serial No. 432,476.

*To all whom it may concern:*

Be it known that I, ALFRED MATHIS, a citizen of the United States, residing at Eldorado, in the county of Saline and State of Illinois, have invented certain new and useful Improvements in a Wheel; and I do hereby declare the following to be a full, clear, and exact description of the invention, such as will enable others skilled in the art to which it appertains to make and use the same.

The object of the invention is to provide a wheel with a demountable rim having simple and efficient means whereby the rim is secured to the felly under conditions insuring a substantial locking of the parts when in use while affording facility in the removal and replacement of the same; and with these objects in view the invention consists in a construction and combination of parts of which a preferred embodiment is shown in the drawings, wherein—

Figure 1 is a side view of a wheel having a felly and rim construction embodying the invention.

Figure 2 is a vertical sectional view of the same.

Figures 3 and 4 are detail views showing respectively the facing surfaces of the rim and felly adjacent to the valve stem openings therein.

Figures 5 and 6 are similar views of portions of the rim and felly at the diametrically opposite side of the wheel from said valve stem.

Figures 7 and 8 are transverse sectional views respectively on the planes 7—7 and 8—8 of Figure 2.

Figure 9 is a fragmentary transverse section through the felly illustrating the actuating means for the locking bolts employed.

Adjacent to and at opposite sides of the valve stem openings 10 and 11 respectively in the rim 12 and felly 13 the rim and felly are provided with complemental interlocking elements 14 and 15 consisting in the construction illustrated of ribs disposed respectively longitudinally and transversely of said rim and felly and having tapered seats 16 and 17 which are adapted to be brought into interlocking relation by a relatively transverse or radial movement of the rim and felly, or by that movement of the rim relative to the felly which is necessary to cause the extension of the valve tube carried by the tire seated on the rim through the opening 11 of the felly.

At spaced points, remote from the valve openings 10 and 11, the rim and felly are provided with other interlocking elements consisting of the wedges 18 and the transverse tapered seats 19 adapted for engagement by a transverse relative movement of the rim and felly as in swinging the rim toward the felly after having effected the seating of the valve tube in the opening 11, the seats 19 being intersected by segmental bolt sections 20 mounted for longitudinal movement in the felly and the wedges 18 being provided with notches or seats 21 for engagement by said bolt sections, or more specifically by reinforced or thickened portions 22 thereof as shown in Figure 6.

The longitudinal movement of the bolt sections may be effected in a variety of ways, but preferably they are provided at their adjacent overlapping extremities with opposed racks 23 engaged by an interposed pinion 24 of which the stem 25 is mounted in a suitable bearing in the felly and has a head 26 which is accessible by a wrench or similar tool from the inner surface of the felly.

Obviously in removing the rim, after having actuated the bolt to release the wedges 18, the rim adjacent to the overlapping extremities of the bolt sections, or at a point remote from the valve tube may be moved transversely or laterally with relation to the wheel felly, after which the rim may be raised or moved radially with relation to the felly to withdraw the valve tube from the opening 11 and at the same time disengage the interlocking elements 14 and 15.

Having thus described the invention, what I claim is:—

A wheel having a felly member, a rim member, one of said members having side flanges, lugs spanning the said flanges, lugs on the other member to engage opposite sides of the first mentioned lugs, flanges joining the first mentioned flanges of the other member to provide seats and having cutaway portions, bolts slidable across said seats through said cutaway portions, said bolts having rack teeth, operating gearing engaging said rack teeth, the other member having wedges adapted to enter said seats and notches to receive said bolts, and said wedges and bolts having cooperating enlargements for the purpose specified.

In testimony whereof I affix my signature in presence of two witnesses.

ALFRED MATHIS.

Witnesses:
C. W. ALLEN,
GERTIE RICHARDSON.